3,060,164
HALOGENATED POLYMER AND PROCESS FOR PRODUCING SAME

Peter J. Canterino, Bartlesville, Okla., assignor to Phillips Petroleum Company, a corporation of Delaware
No Drawing. Filed July 12, 1954, Ser. No. 442,891
13 Claims. (Cl. 260—94.9)

This invention relates to the halogenation of normally solid polymers of ethylene and polymers of other olefins. In one aspect, it relates to a novel process for effecting such halogenation. In another aspect, it relates to a process for effecting such a halogenation in homogeneous solution in a solvent. In another aspect it relates to a method for improving the preparation of halogenated polymers. In another aspect, it relates to a novel halogenated polymer.

It is known in the prior art to prepare solid polymers of ethylene by polymerizing ethylene at high pressures in the presence of a peroxide-type catalyst. The resulting polymers can be fabricated into sheets or tubes and can be molded.

More recently, it has been found that unique solid polymers of ethylene and of certain other olefins can be produced by polymerizing such an olefin, e.g. in solution in a normally liquid hydrocarbon such as an octane, at relatively low pressures in the presence of a catalyst comprising chromium oxide, usually associated with at least one other oxide such as alumina, silica, or mixtures of silica and alumina. This process is described in the copending application of J. P. Hogan and R. L. Banks, Serial No. 333,576, filed January 27, 1953 (see U.S. Patent 2,825,721, 1958). The products of this process are unique solid polymers which are different in certain respects from polymers produced according to the prior art. Although the reasons for the differences are not entirely understood, it appears that the polyethylene prepared according to the above-cited application has a different type of unsaturation and has few or no tertiary carbon atoms in the molecule. Its structure appears to be predominantly a straight-chain structure, and the small amount of unsaturaion is predominantly of the trans-internal or terminal vinyl variety, in contrast to the predominantly "branched-vinyl" unsaturation of the prior art olefin polymers.

It is also known in the prior art to produce a rubber-like material by chlorinating polyethylene which is produced by prior art processes. The chlorination can be effected by reacting the molten polymer with elemental chlorine, by dissolving the polymer in a suitable solvent, such as carbon tetrachloride, and passing chlorine gas through the solution, or by suspending the comminuted polymer in an inert liquid and passing elemental chlorine through the suspension.

I have found that at least a substantial part of the polyethylene produced according to the above-cited process of Hogan and Banks is substantially insoluble in carbon tetrachloride at atmospheric pressure and temperatures up to the boiling point of carbon tetrachloride, i.e. at all temperatures at which carbon tetrachloride exists as a liquid at atmospheric pressure. Thus when such a polyethylene having a molecular weight between 10,000 and 11,000 was treated with carbon tetrachloride in a Soxhlet extractor for 19 hours at reflux temperature and atmospheric pressure, 75 percent of the polyethylene remained undissolved. I have also found that when polyethylene is suspended in a solvent such as carbon tetrachloride and chlorinated by passing elemental chlorine through the suspension, the chlorinated product which is obtained is brittle, non-homogeneous, and relatively unstable at elevated temperatures. When the chlorinated product so obtained is subjected to molding, the product is heterogeneous in appearance and has an undesirable dark color. Such results are obtained when any appreciated part of the polymer fails to dissolve. Thus, it originally appeared that the only method available for chlorinating polyethylene which is produced by polymerization of ethylene in the presence of a chromium oxide catalyst was to conduct the chlorination in suspension in an inert liquid, and this produced a product having undesirable properties.

It has been suggested to dissolve polyethylene in a solvent, such as tetrachloroethane, which is higher-boiling than carbon tetrachloride and to conduct the chlorination utilizing such a solution. I have found, however, that when this method is used, and extensive chlorination is effected, the chlorinated polymer always has a yellowish color, which is apparently due to the presence of impurities which are apparently formed by chlorination of the tetrachloroethane and which are difficult or impossible to remove from the chlorinated polymer product.

I have found that olefin polymers prepared by the polymerization of aliphatic olefins in the presence of a chromium oxide catalyst can be dissolved in carbon tetrachloride by applying pressure to the solvent and increasing the temperature to a value above about 76° C., which is the boiling point of carbon tetrachloride at atmospheric pressure. I have found that when the chlorination is conducted with polyethylene in solution, a chlorinated product can be obtained which is soft and rubbery and substantially colorless. It is uniform in appearance, is flexible, and can be molded without discoloration.

Thus, according to one aspect of the invention, there is provided a novel, substantially homogeneous, halogenated polymer of an olefin, which polymer before halogenation is characterized by substantial insolubility in carbon tetrachloride at all temperatures at which carbon tetrachloride is liquid at atmospheric pressure, said halogenated polymer being capable of being molded without substantial decomposition and containing from 15 to 70 weight percent of chemically combined halogen. In the case of chlorinated polymers of ethylene, the products are rubbery in character when the chlorine content is in the range 15 to 60 weight percent and are brittle and/or resinous when the chlorine content is in the range 60 to 70 weight percent. The halogenated polymers can be molded, for example by melting and casting, without destruction of their homogeneous character and appearance. The halogen combined into the polymer molecule according to this invention is selected from the group consisting of chlorine, bromine, and iodine.

The invention is especially applicable to polyethylenes prepared according to the cited application of Hogan and Banks. Such polyethylenes are characterized by substantial insolubility in carbon tetrachloride, as described, and by the fact that their unsaturation is predominantly of the trans-internal and/or terminal vinyl types, so-called "branched-vinyl" unsaturation being substantially absent. They have melting points (determined by cooling curves) of at least 235° F. and often as high as 240° F. or higher. They have molecular weights in the range 1000 to 200,000.

The products of this invention, when obtained by halogenation of polyethylenes of the type prepared according to the cited application of Hogan and Banks, have improved thermal stability and improved resistance to nitric acid.

According to this invention, a solid polyethylene or other polymer of an aliphatic olefin, which polymer can be produced, for example, by polymerization of ethylene in the presence of a chromium oxide catalyst, and which is substantially insoluble in carbon tetrachloride at atmospheric pressure, is subjected to halogenation with a halogenating reactant while the polymer is maintained in solution in carbon tetrachloride at a temperature above the normal boiling point of the solvent and below the temperature at which the polymer begins to decompose and at superatmospheric pressure sufficient to maintain the solvent substantially in the liquid phase. The halogenating reactant according to this invention is one which introduces a halogen selected from the group consisting of chlorine, bromine, and iodine into the molecule. Ordinarily it is one of the elemental halogens chlorine, bromine or iodine. However, mixtures of these can be used to form a polymer having more than one halogen in the molecule.

The starting material according to this invention is ordinarily a solid, semisolid, or tacky polymer of an aliphatic 1-olefin having a maximum chain length of 8 carbon atoms and no chain branching nearer the double bond than the 4 position which polymer is characterized by a substantial part thereof being substantially insoluble in carbon tetrachloride at temperatures at which carbon tetrachloride is liquid at atmospheric pressure. Such a solid polymer is ordinarily obtained by the polymerization of an aliphatic monoolefin, e.g., ethylene, usually dissolved in a normally liquid hydrocarbon, at moderately elevated temperatures and pressures in the presence of a catalyst comprising chromium oxide associated with at least one other oxide such as silica and/or alumina. However, it is within the scope of the invention to utilize, as starting material, any normally solid olefin polymer which is insoluble, at atmospheric pressure, in carbon tetrachloride, regardless of method of preparation.

The temperature of halogenation is above the normal boiling point of the solvent and not over 150° C. and preferably in the range 95–130° C. when carbon tetrachloride is the solvent. The pressure applied need only be sufficient pressure to maintain the solvent substantially in the liquid phase, although higher pressures can be used when desired.

Although a halogenation catalyst is not absolutely necessary, it is often preferred that such a catalyst be utilized, since the reaction appears to proceed more smoothly in the presence of a catalyst. Suitable catalysts are peroxides and hydroperoxides, e.g., benzoyl peroxide, diisopropylbenzene, hydroperoxide and cumene hydroperoxide, and azo compounds, particularly those having cyano groups on the carbon atoms alpha to the azo nitrogen atoms, such as dimethyl and diethyl alpha,alpha'-azodiisobutyrate, alpha,alpha'-azodiisobutyronitrile, and alpha,alpha' - azobis(alpha,gamma - dimethylvaleronitrile). Alternatively the reaction can be promoted by sunlight or other radiation such as ultraviolet light, a suitable window being provided in the reactor when irradiation is used.

The preferred solvent is ordinarily carbon tetrachloride on account of its inertness toward elemental halogen and on account of the fact that it is readily removable from the halogenated product by distillation or flashing. It has been found that after the halogenation reaction has proceeded to a certain extent, the partially halogenated polymer becomes soluble in carbon tetrachloride even at atmospheric pressure.

According to one modification of this invention chlorination of polyethylene is conducted in two stages, the first stage comprising chlorination of the polyethylene in solution in the solvent at the previously described superatmospheric pressure and temperature until a partially chlorinated product is obtained which is soluble in carbon tetrachloride or similar solvent at a temperature at or below the boiling point of the solvent at atmospheric pressure, and, if desired, the temperature can then be reduced, and the chlorination can be continued in a second stage at a temperature less than or substantially equal to the reflux temperature of the mixture at atmospheric pressure. Ordinarily the chlorination in the first stage is continued until the polymer contains at least 15 weight percent and preferably from 15–25 weight percent of chemically combined chlorine. Further chlorination can then be effected at atmospheric pressure and temperatures ranging from about 25° C. to the reflux temperature of the mixture. The halogenation can be continued in the second stage until a product containing from 25–70 percent or more (e.g. 75%) of chemically combined chlorine or other halogen is obtained.

It is preferred to employ sufficient solvent in the first stage of the process to provide a polymer solution of sufficiently low viscosity so that thorough contacting of the solution with the halogenating agent is readily obtained. The maximum viscosity of the solution depends upon the specific conditions of contacting. Thus, where vigorous mechanical agitation is available, a more viscous solution can be handled than where less vigorous stirring is used. By controlling the viscosity at a relatively low value, the halogenating agent can be readily contacted with the polymer solution and uniformly distributed throughout the mixture in a minimum time, and a more uniformly halogenated product can be obtained. Also, temperature control is facilitated by the use of a solution of low viscosity. Those skilled in the art will be able to control the viscosity of the halogenation reaction mixture at a suitable value upon consideration of the foregoing discussion.

It will be evident to those skilled in the art that the entire extent of chlorination, i.e., up to 70 or 75 percent chemically combined chlorine, can be effected in a single stage at elevated temperatures and pressure, as previously described herein. In many cases, however, it is preferred to conduct the chlorination in two stages, as described herein.

When the invention is practiced according to the two-stage embodiment discussed above, all of the solvent can be added in the first stage; or a portion can be added to the first stage and the remainder to the second stage of the process. It is preferred that the second-stage halogenation be effected in a solution containing from 3 to 20, preferably from 3 to 10, weight percent of the partially halogenated polymer. In the first stage, a more concentrated solution can be employed, e.g., a solution of polymer in carbon tetrachloride, in which the polymer concentration can be as high as 50 weight percent or as low as 3 percent. Additional solvent can, however, be added from time to time in both stages or in either stage of the process. Viscosity can thus be controlled, as previously described.

According to this invention, products containing from very small amounts, e.g., 5 weight percent of combined chlorine or other halogen up to products containing as much as 70 weight percent or more of combined chlorine or other halogen are suitable. When it is desired to prepare a product containing 15 weight percent or less combined chlorine, e.g., from 5 to 15 percent, all of the solvent can be charged initially and the reaction is conducted at a temperature above the normal boiling point of the solvent under sufficient pressure to maintain substantially liquid phase conditions and preferably in a single stage. When a product containing more than 15 weight percent of chlorine is desired, the reaction is preferably conducted in two stages, the first stage being conducted at a temperature above the normal boiling point of the solvent and under superatmospheric pressure until a product containing approximately 15 weight percent chlorine is obtained and the second stage being conducted at atmospheric pressure.

The halogenated polymers prepared according to this invention are useful for the manufacture of adhesives, surface coatings, sheets, films and molded articles. Certain of the products can be considered as a new type of synthetic rubber. They can be formed into tubes, or containers for liquid. They can be used as liners for metal tanks or as constituents of protective coating compositions.

*Example 1*

Ethylene was polymerized over a chromium oxide-silicaalumina catalyst containing 2.4 weight percent chromium as chromium oxide (including hexavalent chromium) at 320° F. and a pressure of 400 p.s.i.g., a space velocity (volumes liquid/volume reactor/hour) of 6, and a feed containing 2.0 weight percent ethylene in isooctane (2,2,4-trimethylpentane). The ethylene feed rate was 1.3 pounds/hour and the isooctane flow was 11 gallons/hour. The polyethylene obtained was insoluble in benzene and acetone, had a density of 0.951, a softening point of 248° F. (method of Karrer, Davis, and Dieterich, Ind. Eng. Chem. Anal. Ed. 2, 96–99 (1930)), a tensile strength of 2000–2100 p.s.i., an inherent viscosity of 0.615, and a molecular weight of 15,040. It was substantially insoluble in carbon tetrachloride under reflux conditions at atmospheric pressure.

A pressure reactor provided with a stirrer was charged with 100 grams of the polyethylene described above, and 600 cc. (960 grams) of carbon tetrachloride. The mixture was heated to 102° C., under a pressure of 8 p.s.i.g., to dissolve the polyethylene, and, during stirring, 74 grams of chlorine were introduced over a period of 1.5 hours. The reaction was effected in the presence of ultraviolet light. Upon cooling to 70° C., the solution became cloudy. The temperature was again increased to the former level, and chlorine was introduced over a five-hour period until a total of 254 grams of chlorine had been added. During the chlorination, the pressure was held at 18 p.s.i.g. and the temperature ranged from 97 to 102° C. After addition of the chlorine the mixture was cooled to room temperature and the product sampled for chlorine content. Analysis showed 15.7 weight percent combined chlorine. This product remained in solution in carbon tetrachloride at the lower temperature. The mixture was diluted with 800 cc. (1280 grams) carbon tetrachloride, warmed to 60 to 65° C., and 100 grams more of chlorine was introduced over a two-hour period. This stage of the reaction was carried out at atmospheric pressure. The product was recovered by precipitation from isopropyl alcohol. It was washed with isopropyl alcohol and dried for 20 hours in a vacuum oven at 50° C. A yield of 140 grams of the chlorinated product was obtained which had a chlorine content of 34.4 weight percent.

A run was made in which 100 grams of the polyethylene suspended in 750 ml. (1200 grams) of carbon tetrachloride was chlorinated at about 80° C. and atmospheric pressure. The polyethylene and carbon tetrachloride were charged to a reactor provided with a reflux condenser, the mixture was heated to reflux temperature, and 127 grams of chlorine was introduced over a three-hour period. The product was precipitated and washed with isopropyl alcohol and dried in a vacuum oven at 50° C. for 20 hours. A yield of 139.1 grams of the chlorinated product was obtained which had a chlorine content of 31.5 weight percent.

Physical properties of each of the chlorinated polymers were determined and are shown below. The sample designated as No. 1 was that chlorinated at about 97 to 107° C. and under pressure during the first part of the process according to this invention, and that designated as No. 2 was that chlorinated in suspension at about 80° C. and atmospheric pressure.

Sample No. 1 was a soft, rubbery product which was substantially colorless. Sample No. 2 was a hard, brittle product which was slightly yellow. A sample of No. 2 which was compression molded was not uniform in appearance while sample No. 1 appeared homogeneous when molded.

From the foregoing, it is evident that a product is obtained according to this invention by chlorination in solution, which product is superior in properties to that obtained by chlorination in suspension.

*Example II*

A polyethylene having a molecular weight of about 10,000 and produced as described in Example I was chlorinated by the procedure of Example I to obtain a chlorinated polymer containing 24.3 weight percent combined chlorine.

A commercial polyethylene having a molecular weight in the range 18,000 to 19,000 was chlorinated by dissolving 360 grams of it in 3.5 liters of carbon tetrachloride at about 70° C. and passing 287 grams of chlorine gas through the solution at about 70° C. The solution was stirred and irradiated with ultraviolet light during the chlorination. The reaction mixture was poured into isopropyl alcohol. The resulting coagulated material was broken into small pieces, washed with isopropyl alcohol and dried overnight in a vacuum oven. The yield was 479 grams of chlorinated polymer containing 25.8 weight percent combined chlorine.

The two chlorinated products were compression molded to form discs, some of which were kept immersed in 70 percent nitric acid for 7 days at 28° C.

The following inspection data on the discs immersed in nitric acid were then obtained:

| Sample | Wt. Increase, Percent | Diam. Increase, Ave. Percent | Thickness Increase, Percent | Condition |
|---|---|---|---|---|
| A [1] | 0.82 | 1.05 | 3.2 | Washed with H₂O, dried in air. |
| B [1] | 1.28 | 0.017 | 0.0 | Do. |
| A | −0.12 | [2] | [2] | Washed with H₂O, vacuum dried overnight at 50° C. |
| B | 0.30 | [2] | [2] | Do. |

[1] A is sample according to this invention. B is chlorinated commercial polyethylene.
[2] B was distorted. A was not.

The foregoing data show that the chlorinated polyethylene of this invention is more resistant to concentrated nitric acid than the chlorinated prior art polyethylene.

The heat stability of products A and B, above, was determined by placing a weighed sample of each in a tared metal cup in an oven containing air and were maintained at 140° C. for 68 hours. The temperature was then increased to 155° C. and maintained at 155° C. for 3 hours. The temperature was then maintained at 170° C. until a total time of 88.75 hours had elapsed.

| Sample Number | Flex Point, °F. | Density | Softening Point, °F. | Elongation, Percent | Tensile Strength, p.s.i.g. | Inherent Viscosity | Solubility Benzene | Solubility Acetone |
|---|---|---|---|---|---|---|---|---|
| 1 | −26 | 1.232 | Soft at room temp. | [1] 1,600 | [2] 160 | 0.393 | Soluble | Insoluble; swells. |
| 2 | Too brittle to measure. | 1.169 | 240 | about 1 | 1,055 | 0.391 | Insoluble | Insoluble. |

[1] Maximum value that can be measured on the testing device.
[2] Tensile at 1600 percent elongation was 160 p.s.i.

Final weighings were then made. The following results were obtained:

| Sample | A | B |
|---|---|---|
| Initial weight, gm | 3.3390 | 3.3640 |
| Weight after 68 hr. at 140° C., gm | 3.3225 | 3.3345 |
| Loss, gm | 0.0165 | 0.0295 |
| Loss, wt. percent | 0.493 | 0.875 |
| Weight after 3 addt'l. hr. at 155° C., gm | 3.3165 | 3.3260 |
| Cumulative loss, gm | 0.0225 | 0.0380 |
| Cumulative loss, wt. percent | 0.673 | 1.13 |
| Wt. after 17.75 addt'l. hr. at 170° C., gm | 3.2920 | 3.2910 |
| Cumulative loss, gm | 0.0470 | 0.0730 |
| Cumulative loss, wt. percent | 1.41 | 2.17 |

The foregoing data show that the products of this invention have higher thermal stability than chlorinated prior art polyethylenes.

*Example III*

Discs of the two chlorinated polyethylenes described in Example II were prepared by compression molding. The discs had the following dimensions:

| | Thickness, in. | Diameter, in. | Weight, gm. |
|---|---|---|---|
| A (this invention) | 0.093 | 2.25 | 6.428 |
| B (chlorinated commercial polyethylene) | 0.086 | 2.20 | 5.874 |

The discs were separately immersed in red fuming nitric acid (anhydrous $HNO_3$ containing 20 weight percent of nitrogen oxides, calculated as $NO_2$; sp. gr. 1.59 to 1.60 at 20° C.), for a period of 55 hours at about 28° C. At intervals, the discs were removed from the acid, washed with water, dried, weighed, and returned to the acid. The following data were obtained:

| Time, hr. | Weight Increase, percent | |
|---|---|---|
| | A | B |
| 0 | 0 | 0 |
| 3.5 | 2.2 | 3.4 |
| 5.5 | 3.1 | 5.1 |
| 13 | 5.8 | 12.5 |
| 29.5 | 11.0 | 25.0 |
| 55 | 16.0 | 30.0 |

After the last of the above-mentioned weight determinations, the discs were heated in a vacuum oven for 28 hours at 50° C. and were then weighed. The following results were obtained:

Weight Loss, percent
A ------------------------------------------- 0.53
B ------------------------------------------- 6.15

The portions of the nitric acid which had been used in each of the described tests was poured into water at room temperature. The acid in which product A had been immersed produced a clear solution. That in which product B had been immersed produced a turbid solution, indicating that a substantial part of the chlorinated commercial polyethylene had dissolved in the nitric acid.

The following comparative data on the dimensions and hardness of the discs were obtained:

| | A | B |
|---|---|---|
| Diameter, in.: | | |
| Original | 2.25 | 2.20 |
| After 55 hr. immersion | | |
| After oven treatment | 2.20 | 2.19 |
| Thickness, in.: | | |
| Original | 0.093 | 0.086 |
| After 55 hr. immersion | 0.098 | 0.093 |
| After oven treatment | 0.098 | 0.081 |
| Shore Hardness (A-2): | | |
| Original | 58 | 62 |
| After oven treatment | 63 | 56 |

The foregoing data show that the chlorinated polyethylene prepared according to this invention is more resistant to fuming nitric acid than the chlorinated prior art polyethylene.

The reason why the products according to this invention are superior to those prepared according to the prior art process of chlorination in suspension is not well understood. It is believed that chlorination in solution produces a more uniformly chlorinated product and that this may contribute to homogeneity in appearance and thermal stability. It is also possible that the absence of branched-vinyl unsaturation of the polymers halogenated according to this invention contributes to the thermal stability, since it is known that compounds containing chlorine attached to a tertiary carbon atom decompose more easily, liberating HCl, than nontertiary chlorinated compounds.

The different types of unsaturation above referred to are illustrated by the following formulae:

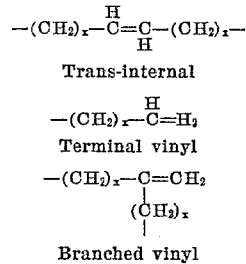

It will be evident to those skilled in the art that halogenating agents or reactants other than elemental halogen, e.g., compounds which supply elemental halogen under the disclosed reaction conditions, can be used according to this invention. Although the invention has been discussed and illustrated by chlorination, bromination and iodination are also within the scope of the invention.

While certain compositions, examples and process steps have been disclosed for purposes of illustration, it is clear that the invention is not limited thereto. Variation and modification are possible within the scope of the disclosure and the claims. The essence of the invention is that a polymer of an aliphatic olefin, which polymer is insoluble in carbon tetrachloride or similar solvent at temperature at which such solvent is liquid at atmospheric pressure, can be chlorinated, brominated, and/or iodinated in solution in carbon tetrachloride or similar low-boiling solvent, at superatmospheric pressure and a temperature above the normal boiling point of the solvent; and a novel halogenated polymer is obtained.

The molecular weights referred to herein are those determined by the methods of Kemp and Peters, Ind. Eng. Chem. 35, 1108 (1943), and Dienes and Klemm, J. App. Phys. 17, 458–471 (June 1946).

The molecular weights were calculated according to the equation $$M = \frac{4.03 \times 10^3 \times N_i \times 14}{2.303}$$

wherein M is the molecular weight and $N_i$ is the intrinsic viscosity as determined for a solution of 0.2 gm. of polymer in 50 cc. of tetralin at 130° C.

Although the examples illustrate batch-type operation, it will be evident to those skilled in the art that continuous operation can be practiced within the scope of the disclosure and claims.

Reference is made to the copending application of P. J. Canterino and J. N. Baptist, Serial No. 446,666, filed July 29, 1954, now Patent No. 2,920,064.

I claim:

1. A process which comprises reacting elemental chlorine with a normally solid polymer of ethylene which polymer has been produced by polymerization of ethylene in the presence of a chromium oxide-containing polymerization catalyst, the reaction with chlorine being conducted while said polymer is in solution in carbon tetrachloride at a temperature in the range 95–130° C. and a pressure sufficient to maintain the carbon tetrachloride substantially in the liquid phase, said polymer being substantially insoluble in carbon tetrachloride at atmospheric pressure, thus producing a chlorinated polymer of ethylene.

2. A chlorination process which comprises reacting elemental chlorine with a normally solid polymer of ethylene which has been produced by polymerizing ethylene in the presence of a catalyst comprising chromium oxide, said polymer being substantially insoluble in carbon tetrachloride and temperatures up to and including the boiling point of carbon tetrachloride at atmospheric pressure, the chlorination reaction being conducted while said polymer is maintained in solution in carbon tetrachloride at a temperature above the normal boiling point of carbon tetrachloride but not above 150° C. and a pressure sufficient to maintain said carbon tetrachloride substantially in the liquid phase, continuing the reaction with chlorine until a chlorinated polymer is obtained which is soluble in carbon tetrachloride at atmospheric pressure, reducing the pressure and the temperature, continuing the chlorination at substantially atmospheric pressure and at a temperature up to the reflux temperature, and recovering a chlorinated polymer.

3. A chlorinated polyethylene prepared by the method of claim 2.

4. A process for the chlorination of a normally solid polymer of ethylene which has been produced by the polymerization of ethylene in the presence of a catalyst comprising chromium oxide including hexavalent chromium, said polymer being substantially insoluble in carbon tetrachloride at atmospheric pressure and having a molecular weight in the range of 1000 to 200,000, which process comprises dissolving said polymer in carbon tetrachloride at a temperature in the range 95–130° C., and a superatmospheric pressure sufficient to maintain the carbon tetrachloride substantially in the liquid phase, passing elemental chlorine through the resulting solution at a temperature in said range until a chlorinated polymer is obtained which contains at least 15 weight percent chemically combined chlorine, reducing the pressure to about atmospheric, continuing the passing of chlorine through the resulting solution at a temperature in the range from 25° C. to the reflux temperature of the solution, and recovering a chlorinated polymer.

5. A process according to claim 4 wherein the concentration of polymer in carbon tetrachloride at superatmospheric pressure is up to 50 weight percent, and the concentration of polymer in solution at atmospheric pressure is in the range 3 to 20 weight percent.

6. A process according to claim 4 wherein a chlorinated polymer containing from 15 to 25 percent of combined chlorine is obtained at said superatmospheric pressure and a chlorinated polymer containing from 25 to 70 percent combined chlorine is obtained at atmospheric pressure.

7. A process which comprises reacting a halogen selected from the group consisting of chlorine, bromine, and iodine with a normally solid polymer of an aliphatic 1-monoolefin having a maximum monomer chain length of 8 carbon atoms and no branching nearer the double bond than the 4-position, which polymer is substantially insoluble in carbon tetrachloride at all temperatures at which carbon tetrachloride is liquid at atmosphereic pressure, maintaining said polymer in solution in carbon tetrachloride at a temperature from above the normal boiling point of carbon tetrachloride to 150° C. and a pressure sufficient to maintain said carbon tetrachloride substantially in the liquid phase during the reaction, and recovering a halogenated polymer.

8. A halogenation process which comprises reacting a halogenation agent with a normally solid polymer of an aliphatic 1-monoolefin having a maximum monomer chain length of 8 carbon atoms and no branching nearer the double bond than the 4-position which polymer is substantially insoluble in carbon tetrachloride at atmospheric pressure and temperatures up to and including the boiling point of carbon tetrachloride, the halogenation being conducted while said polymer is maintained in solution in carbon tetrachloride, at a temperature above the normal boiling point of carbon tetrachloride but not greater than 150° C. and a pressure sufficient to maintain said carbon tetrachloride substantially in the liquid phase, continuing the halogenation until a halogenated polymer is obtained which is soluble in said carbon tetrachloride at atmospheric pressure, reducing the pressure and the temperature, continuing the halogenation at a pressure not substantially greater than atmospheric, and recovering a halogenated polymer.

9. A process for the chlorination of a normally solid polymer of ethylene which polymer is substantially insoluble in carbon tetrachloride at atmospheric pressure and temperatures up to the normal boiling point of carbon tetrachloride, which process comprises dissolving said polymer in carbon tetrachloride at a temperature in the range 95 to 130° C. and a superatmospheric pressure sufficient to maintain the carbon tetrachloride substantially in the liquid phase, contacting elemental chlorine with the resulting solution at a temperature in the said range and at said superatmospheric pressure until a partially chlorinated polymer is obtained which contains at least 15 weight percent of chemically combined chlorine, reducing the pressure to approximately atmospheric, continuing the contacting with chlorine at a temperature in the range from approximately 25° C. to approximately the reflux temperature of the solution at substantially atmospheric pressure, and recovering a chlorinated polymer.

10. A process which comprises reacting a halogen selected from the group consisting of chlorine, bromine and iodine with a normally solid polymer of an aliphatic 1-monoolefin having a maximum monomer chain length of 8 carbon atoms and no branching nearer the double bond than the 4-position while said polymer is in solution in carbon tetrachloride at a temperature which is greater than the normal boiling point of carbon tetrachloride but insufficient to effect thermal decomposition of said polymer and at a superatmospheric pressure sufficient to maintain the carbon tetrachloride substantially in the liquid phase, said polymer being substantially insoluble in carbon tetrachloride at atmospheric pressure and temperatures up to and including the boiling point of carbon tetrachloride, and thus effecting halogenation of said polymer.

11. A process which comprises reacting chlorine with a normally solid polymer of ethylene while said polymer is in solution in carbon tetrachloride at a temperature in the range 95 to 150° C. and a superatmospheric pressure sufficient to maintain said carbon tetrachloride substantially in the liquid phase, said polymer being substantially insoluble in carbon tetrachloride at those temperatures at which carbon tetrachloride exists as a liquid at atmospheric pressure, and recovering a chlorinated polymer of ethylene.

12. A process for the chlorination of a normally solid polymer of ethylene which polymer has a molecular weight in the range 1000 to 200,000 and is substantially insoluble in carbon tetrachloride at atmospheric pressure and temperatures up to and including the boiling point of carbon tetrachloride, which process comprises dissolving said polymer in carbon tetrachloride at a temperature above the normal boiling point thereof but below the thermal decomposition temperature of said polymer and at a superatmospheric pressure sufficient to maintain the carbon tetrachloride substantially in the liquid phase, maintaining said polymer substantially completely in solution in carbon tetrachloride at such superatmospheric pressure and a temperature in the last-mentioned range, contacting elemental chloride with the resulting solution at a temperature in said last-mentioned range and at such superatmospheric pressure until a partially chlorinated polymer is obtained which is soluble in liquid carbon tetrachloride at atmospheric pressure, reducing the chlorination pressure to a value not substantially greater than atmospheric, reducing the chlorination temperature, continuing the reaction with chlorine at a temperature up to reflux temperature of the solution, and thus further chlorinating said polymer.

13. A process which comprises reacting chlorine with a normally solid polyethylene which is substantially insoluble in carbon tetrachloride at those temperatures at which carbon tetrachloride is liquid at atmospheric pressure while said polyethylene is maintained in solution in carbon tetrachloride at a temperature above the normal boiling point of carbon tetrachloride but not greater than 150° C. and a pressure sufficient to maintain said carbon tetrachloride substantially in the liquid phase during the reaction, thus producing a chlorinated polyethylene.

References Cited in the file of this patent

UNITED STATES PATENTS

| | | |
|---|---|---|
| 2,398,803 | Myles | Apr. 23, 1946 |
| 2,571,901 | Lawlor | Oct. 16, 1951 |
| 2,748,105 | Becker et al. | May 29, 1956 |
| 2,771,463 | Field | Nov. 20, 1956 |
| 2,825,721 | Hogan | Mar. 4, 1958 |

UNITED STATES PATENT OFFICE
CERTIFICATE OF CORRECTION

Patent No. 3,060,164　　　　　　　　　　　　　　October 23, 1962

Peter J. Canterino

It is hereby certified that error appears in the above numbered patent requiring correction and that the said Letters Patent should read as corrected below.

Column 10, line 73, for "chloride" read -- chlorine --.

Signed and sealed this 14th day of May 1963.

(SEAL)
Attest:

ERNEST W. SWIDER
Attesting Officer

DAVID L. LADD
Commissioner of Patents